United States Patent
Zhang et al.

(10) Patent No.: US 10,516,528 B2
(45) Date of Patent: Dec. 24, 2019

(54) SYSTEM AND METHOD FOR MANAGING SECRET INFORMATION USING VIRTUALIZATION

(71) Applicant: NICIRA, INC., Palo Alto, CA (US)

(72) Inventors: Jianqing Zhang, Palo Alto, CA (US); Ganesan Chandrashekhar, Palo Alto, CA (US); Sonia Jahid, Palo Alto, CA (US); Amit Vasant Patil, Pune (IN); Sujatha Sundararaman, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 146 days.

(21) Appl. No.: 15/402,240

(22) Filed: Jan. 10, 2017

(65) Prior Publication Data

US 2018/0062834 A1     Mar. 1, 2018

(30) Foreign Application Priority Data

Aug. 31, 2016 (IN) .............................. 201641029811

(51) Int. Cl.
    *H04L 9/08*         (2006.01)

(52) U.S. Cl.
    CPC .............. *H04L 9/085* (2013.01); *H04L 9/083* (2013.01); *H04L 9/0894* (2013.01)

(58) Field of Classification Search
    CPC ....... H04L 9/085; H04L 9/0894; H04L 9/083; H04L 9/08

USPC ......... 380/279, 278, 255, 277; 713/150, 171
See application file for complete search history.

(56) References Cited

U.S. PATENT DOCUMENTS

| | | | |
|---|---|---|---|
| 7,970,133 B2* | 6/2011 | Davidson | H04L 9/0618 380/277 |
| 9,258,120 B1* | 2/2016 | Allen | H04L 9/0894 |
| 2012/0297206 A1* | 11/2012 | Nord | G06F 21/602 713/193 |
| 2013/0191632 A1* | 7/2013 | Spector | H04L 9/083 713/155 |
| 2013/0191648 A1* | 7/2013 | Bursell | G06F 9/4856 713/189 |

* cited by examiner

*Primary Examiner* — Ashokkumar B Patel
*Assistant Examiner* — Quazi Farooqui
(74) *Attorney, Agent, or Firm* — Loza & Loza, LLP (57) ABSTRACT

A distributed computer system and method for managing secret information for virtual entities in the distributed computer system utilizes multiple secret storage service entities to provide secret information to a virtual entity to be hosted in a host computer in the distributed computer system. At least one piece of the secret information for the virtual entity is distributed to the multiple secret storage service entities to provide the secret information to the virtual entity using the at least one piece of the secret information from one of the multiple secret storage service entities.

19 Claims, 9 Drawing Sheets

FIG. 7

SYSTEM AND METHOD FOR MANAGING SECRET INFORMATION USING VIRTUALIZATION

RELATED APPLICATIONS

Benefit is claimed under 35 U.S.C. 119(a)-(d) to Foreign application Serial No. 201641029811 filed in India entitled "SYSTEM AND METHOD FOR MANAGING SECRET INFORMATION USING VIRTUALIZATION", on Aug. 31, 2016, by NICIRA, INC., which is herein incorporated in its entirety by reference for all purposes.

BACKGROUND

Protection of critical secret information, such as passwords, private keys or master keys at-rest for computer systems, is a challenging task. Secret information can be protected by access control mechanisms provided by the file system of an operating system, or encrypted by a secret key, which is either derived from a password or retrieved from hardware modules, such as Trusted Platform Module (TPM), or requested from a third-party secret management service.

These conventional approaches have one or more limitations, which may jeopardize the security of the protected secret information. One of the limitations may be the lack of defense-in-depth. In some of these conventional approaches, secret materials may possibly be stored at the same location (e.g., a file system) with the data being protected via encryption using a key derived from the secret materials. This violates the principle of cryptographic storage that the secret information (e.g., a key) must not be stored in the same location as the data it is protecting (e.g., encrypted data).

Another limitation of some of the conventional approaches is the limited support of high availability. The applications/software leveraging the secret information may be "locked" with the particular hardware platform if the secret information is stored in hardware modules, like TPM, on a particular physical platform. Thus, migration of the software to other physical hardware platforms is restricted, which is a common practice for high available systems.

A limitation with respect to the third-party secret management service approach is that system independence is sacrificed for the third-patty's security strengthened service to manage the secret information. In addition, since secret information is usually hosted by one entity, a compromise of the entity may lead to compromise of all the secret information being managed by that entity. Furthermore, the third-party secret management service is usually expensive, which may not be a viable solution for small businesses.

BRIEF DESCRIPTION OF THE DRAWINGS

Throughout the description, similar reference numbers may be used to identify similar elements.

DETAILED DESCRIPTION

Figure 1:
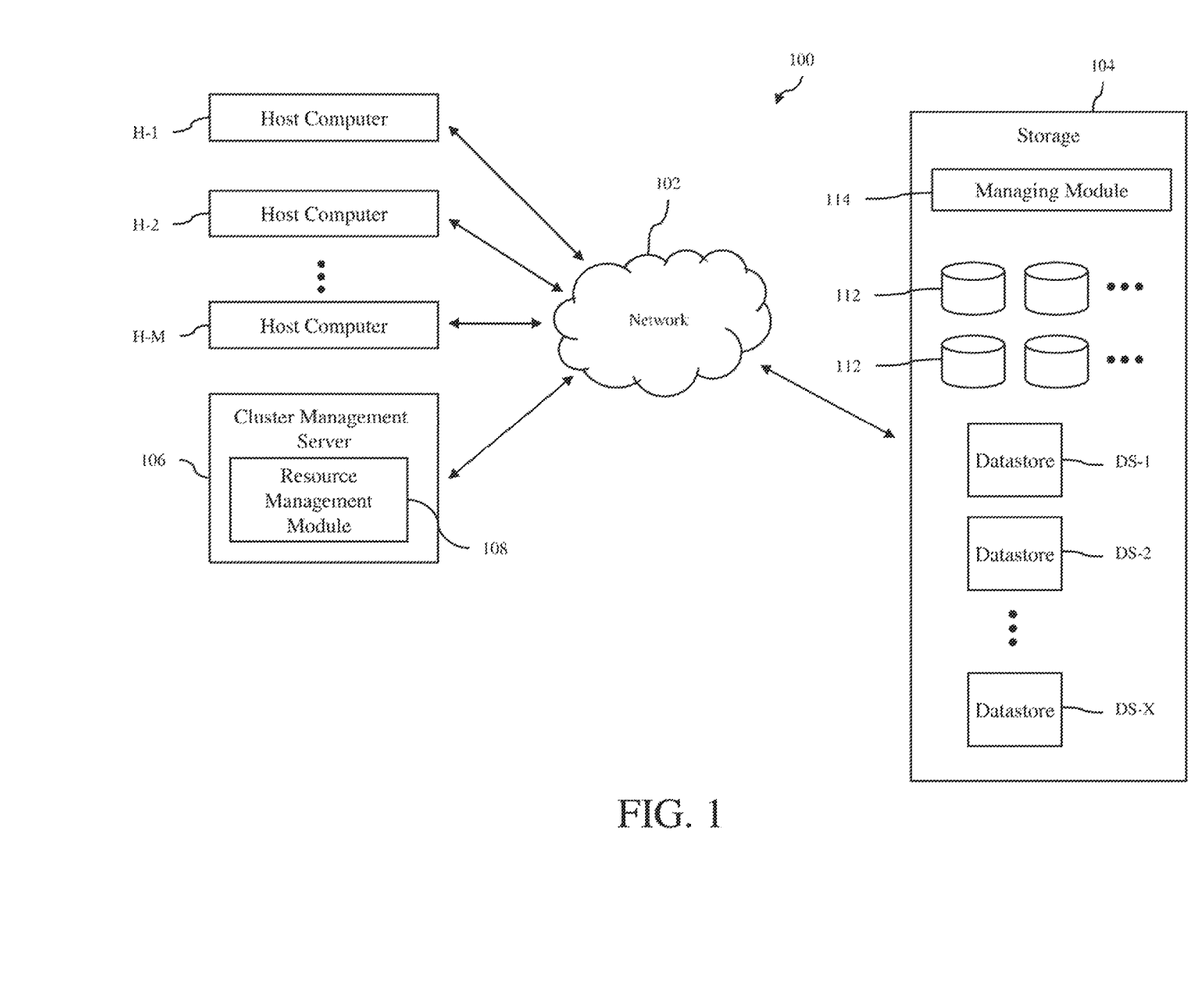
FIG. 1 is a block diagram of a distributed computer system in accordance with an embodiment of the invention.

FIG. 1 shows a distributed computer system 100 in which embodiments of the invention may be implemented. As explained in detail below, embodiments of the invention facilitate secured protection of any type of information that needs to be kept private, including secret information, such as cryptographic keys, in a virtualized environment, which is provided by a computing infrastructure, such as the distributed computer system 100.

As illustrated in FIG. 1, the distributed computer system 100 includes a network 102, a cluster of host computers H-1, H-2 . . . H-M (where M is a positive integer), storage 104 and a cluster management server 106. The host computers, the storage and the cluster management server are connected to the network. Thus, each of the host computers is able to access the storage via the network and may share the resources provided by the storage with the other host computers. Consequently, any process running on any of the host computers may also access the storage via the network.

In an embodiment, the host computers H-1, H-2 . . . H-M are physical computer systems that host or support one or more virtual entities so that the virtual entities are executing on the physical computer systems. As used herein, the term "virtual entity" is any software entity that can run on a computer system, such as a software application, a software process, a virtual machine (VM) or a "container" that provides system-level process isolation or operating system level virtualization such as Docker™. The host computers may be servers that are commonly found in datacenters. As an example, the host computers may be servers installed in a single server rack. However, in other embodiments, the host computers may be installed in multiple server racks in the same or different facilities. Still, in other embodiments, the host computers may be software processes running on multiple physical computer systems.

Figure 2:
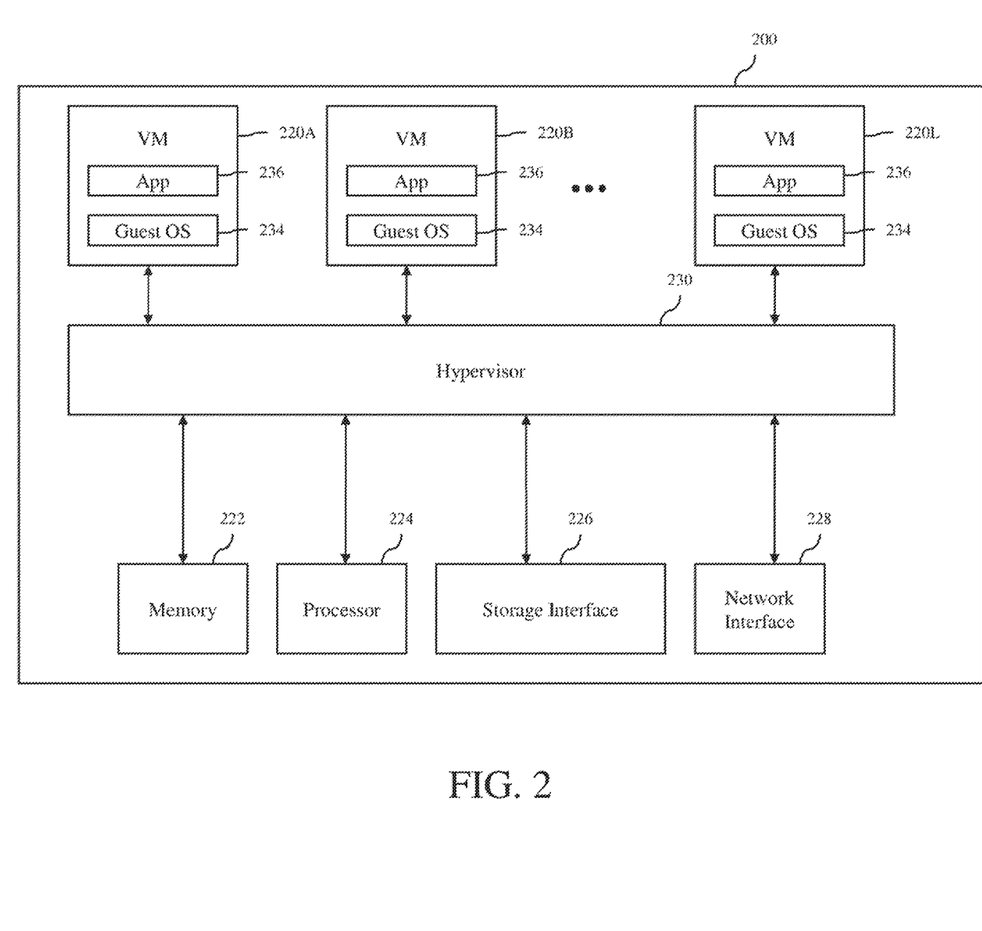
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of virtual entities 220A, 220B . . . 220L (where L is a positive integer), which are VMs. The number of VMs supported by the host computer can be anywhere from one to more than one hundred. The exact number of VMs supported by the host computer is only limited by the physical resources of the host computer and the resource requirements of the VMs. The VMs share at least some of the hardware resources of the host computer, which include one or more system memories 222, one or more processors 224, one or more storage interfaces 226, and one or more network interfaces 228. Each system memory 222, which may be random access memory (RAM), is the volatile memory of the host computer. Each processor 224 can be a type of a processor, such as a central processing unit (CPU) commonly found in a server. In some embodiments, each processor may be a multi-core processor, and thus, includes multiple independent processing units or cores. The storage interface 226 is an interface that allows that host computer to communicate with the storage 104. As an example, the storage interface may be a host bus adapter or a network file system interface. The network interface 228 is an interface that allows the host computer to communicate with other devices connected to t e network 102. As an example, the network interface may be a network adapter.

In the illustrated embodiment, the VMs 220A, 220B, . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 234 and one or more guest applications 236. The guest operating system manages virtual system resources made available to the corresponding VM by the hypervisor, and, among other things, the guest operating system forms a software platform on top of which the guest applications run.

Similar to any other computer system connected to the network 102, the VMs 220A, 220B, . . . 220L are able to communicate with other computer systems connected to the network using the network interface 228 of the host computer 200. In addition, the VMs are able to access the storage 104 using the storage interface 226 of the host computer.

Turing back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M, which can be accessed like any other storage device connected to computer systems. In an embodiment, the storage can be accessed by entities, such as clients running on the host computers, using any the system, e.g., virtual machine file system (VMFS) or network file system (NFS). The storage includes one or more computer data storage devices 112, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 114, which manages the operation of the storage. In an embodiment, the storage managing module is a computer program executing on one or more computer systems not shown) of the storage. The storage supports multiple datastores DS-1, DS-2, . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers H-1, H-2 . . . H-M. For virtual machines, the datastores may be used to store virtual storage, e.g., virtual disks, used by each of the virtual machines, as well as other files needed to support the virtual machines. One or more datastores may be associated with one or more clusters. The same datastore may be associated with more than one cluster.

The cluster management server 106 operates to monitor and manage the host computers H-1, H-2 . . . H-M in the cluster. The cluster management server may be configured to monitor the current configurations of the host computers and the virtual entities running on the host computers, for example, virtual machines (VMs). The monitored configurations may include hardware configuration of each of the host computers and software configurations of each of the host computers. The monitored configurations may also include virtual entity hosting information, i.e., which virtual entities (e.g., VMs) are hosted or running on which host computers. The monitored configurations may also include information regarding the virtual entities running on the different host computers.

The cluster management server 106 may also perform operations to manage the virtual entities and the host computers H-1, H-2 . . . H-M in the cluster. As illustrated in FIG. 1, in an embodiment, the cluster management server includes a resource management module 108, which can be enabled by a user, to perform various resource management operations for the cluster, including virtual entity placement operations for either initial placement of virtual entities and/or load balancing. The process for initial placement of virtual entities, such as VMs, may involve selecting suitable host computers for placement of the virtual entities based on memory and CPU requirements of the virtual entities, the current memory and CPU load on all the host computers in the cluster and the memory and CPU capacity of all the host computers in the cluster.

In some embodiments, the cluster management server 106 may be a physical computer. In other embodiments, the cluster management server ma be implemented as one or more software programs running on one or more physical computers, such as the host computer 200 shown in FIG. 2, or virtual computers, such as the VMs 220A, 220B . . . 220L. In an implementation, the cluster management server is a VMware vCenter™ server with at least some of the features available for such a server, and the resource management module 108 in the cluster management server is VMware vSphere® Distributed Resource Scheduler™ module.

Since new virtual entities may be deployed on the host computers H-1, H-2 . . . H-M in the cluster and existing virtual entities may be migrated between the host computers, secret information used by the virtual entities and/or applications running on the virtual entities should not be stored and retrieved from the hardware of a single host computer. In addition, the secret information for the virtual entities should not be stored with virtual entities and retrieved from them only because this violates the principle of cryptographic storage that the secret information (e.g., a key) must not be stored in the same location as the data it is protecting (e.g., encrypted data). Embodiments of the invention allow for secret information used by the virtual entities and/or its applications to be stored in a secure manner that addresses these challenges. In the following description, VMs are used to describe the embodiments of the invention. However, these embodiments of the invention may be applied to other virtual entities.

In a first embodiment of invention, secret information for each VM in the distributed computer system 100, which may be used by that VM and/or one or more applications running on the VM, is stored in multiple secret storage service entities. That is, each of the multiple secret storage service entities has the entire or complete secret information for the VM. These secret storage service entities may be storage entities provided by one or more external service providers. Each secret storage service entity may have security mechanisms that ensure that secret information stored in that secret storage service entity is secure. As an example, each secret storage service entity may be a virtual storage application with strong security features running on an external computing infrastructure. Alternatively, these secret storage service entities may be host computers, which are designated as being trusted host computers. A trusted host computer is a host computer that has been security strengthened using one or more security mechanisms, such as a security software program. Thus, a trusted host computer has greater security protection than non-trusted host computers. In one implementation, the trusted host computers are host computer in the distributed computer system 100 and may be part of the cluster of host computers H-1, H-2 . . . H-M. Furthermore, the trusted host computers may not be utilized to host any virtual entities.

When a virtual entity, such as a VM, is created and registered in the cluster management server 106, secret information is generated and assigned to that VM. The generated secret information is then stored at the secret storage service entities. Thus, the secret information is stored in the secret storage service entities, i.e., different storage facilities of one or more external service providers of the secret storage service entities, or stored in different trusted host computers, i.e., storage associated with the trusted host computers, which may be local or remote storage.

When a VM is deployed on a host computer, that host computer verifies the image of the VM and the identity of the VM. The host computer then communicates with one of the secret storage service entities and retrieves the secret information assigned to the VM using the VM's identify and provides the secret information to the VM. Since there are more than one secret storage service entity that has the secret information assigned to the VM, the host computer can retrieve the secret information assigned to the VM from any of the secret storage service entities. After the secret information is given to the VM, the host computer deletes the secret information so that the host computer no longer has the secret information.

When the VM is migrated to another host computer for any reason, such as for high availability or for load balancing, the new host computer can retrieve the secret information for the VM from the same or another secret storage service entity. Thus, the application running on the VM that may require the secret information will not be interrupted.

Figure 3:
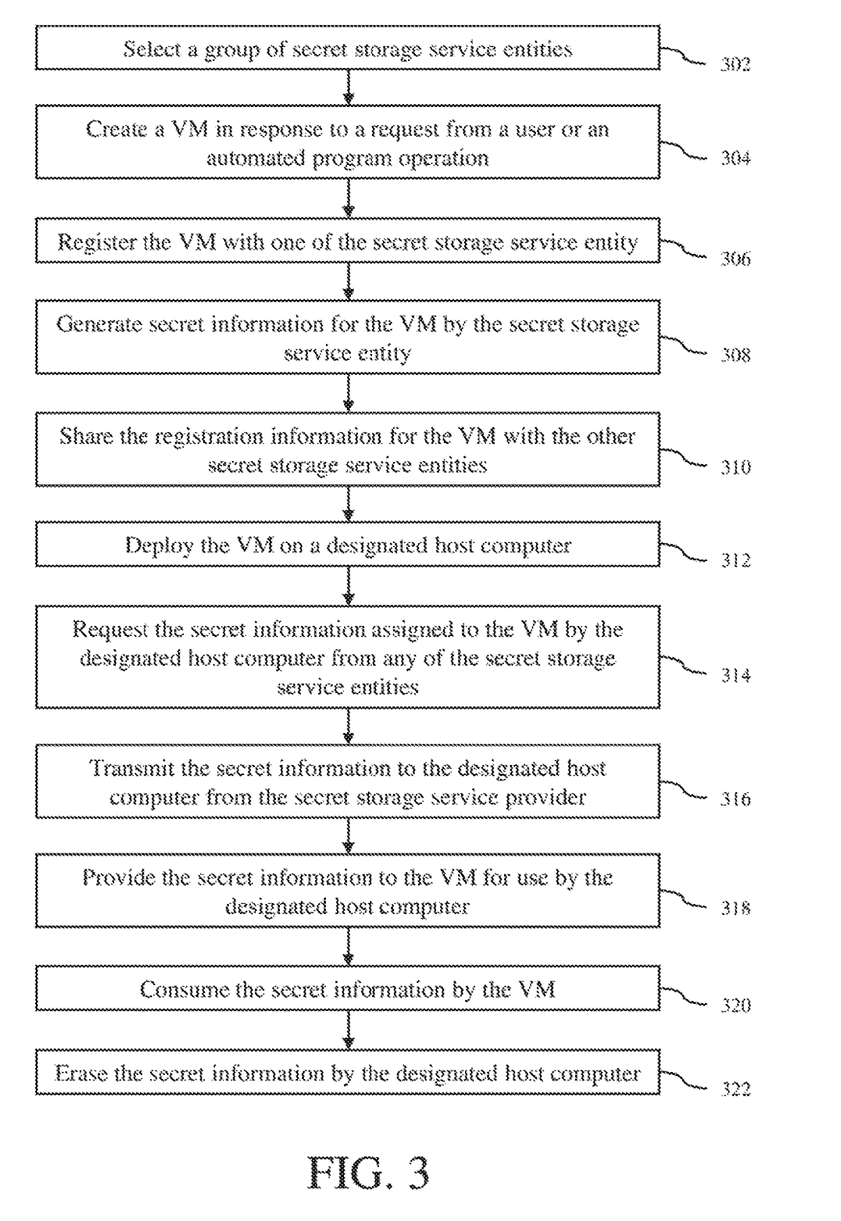
FIG. 3 is a process flow diagram of the secret management operation of the distributed computer system in accordance with a first embodiment of the invention.

This secret management operation of the distributed computer system in accordance with the first embodiment of the invention is described with reference to a process flow diagram of FIG. 3. At block 302, a group of secret storage service entities is selected by a user, such as an administrator of the distributed computer system. In some implementations, the group of secret storage service entities is a group of trusted host computers, which may be selected from the host computers H-1, H-2 . . . H-M in the cluster or other host computers (not shown) in the distributed computer system 100. In these implementations, the trusted host computers are connected through secure communication channels, e.g. Transport Layer Security (TLS) channels, to transmit and receive information.

At block 304, a VM is created by the cluster management server 106 in response to a request from a user or an automated program operation, such as an auto-scaling operation for a large-scale application running on multiple VMs. At block 306, the VM is registered with one of the secret storage service entity by the cluster management server using identification (ID) of the VM. At block 308, in response to the registration, secret information for the VM is generated by the secret storage service entity. At block 310, the registration information for the VM, including, the VM ID and the secret information, is shared with the other secret storage service entities.

Next, at block 312, the VM is deployed on a designated host computer in the distributed computer system 100, which is controlled by the cluster management server 106. As part of the deployment, the ID of the VM is verified by the designated host computer to ensure that the right VM is being deployed at the designated host computer. At block 314, the secret information assigned to the VM is requested by the designated host computer from any of the secret storage service entities. At block 316, in response to the request, the secret information is transmitted to the designated host computer from the secret storage service provider.

Next, at block 318, the designated host computer provides the received secret information to the VM for use. At block 320, the secret information is consumed by the VM, e.g., to obtain a session key, or by one or more applications running on the VM. As part of this consumption, the secret information is not stored by the VM, and thus, the secret information is not held by the VM. At block 322, after the VM has consumed the secret information, the designated host computer erases the secret information so that the host computer no longer has the secret information, i.e., the secret information is no longer stored on the host computer.

Figure 4A:
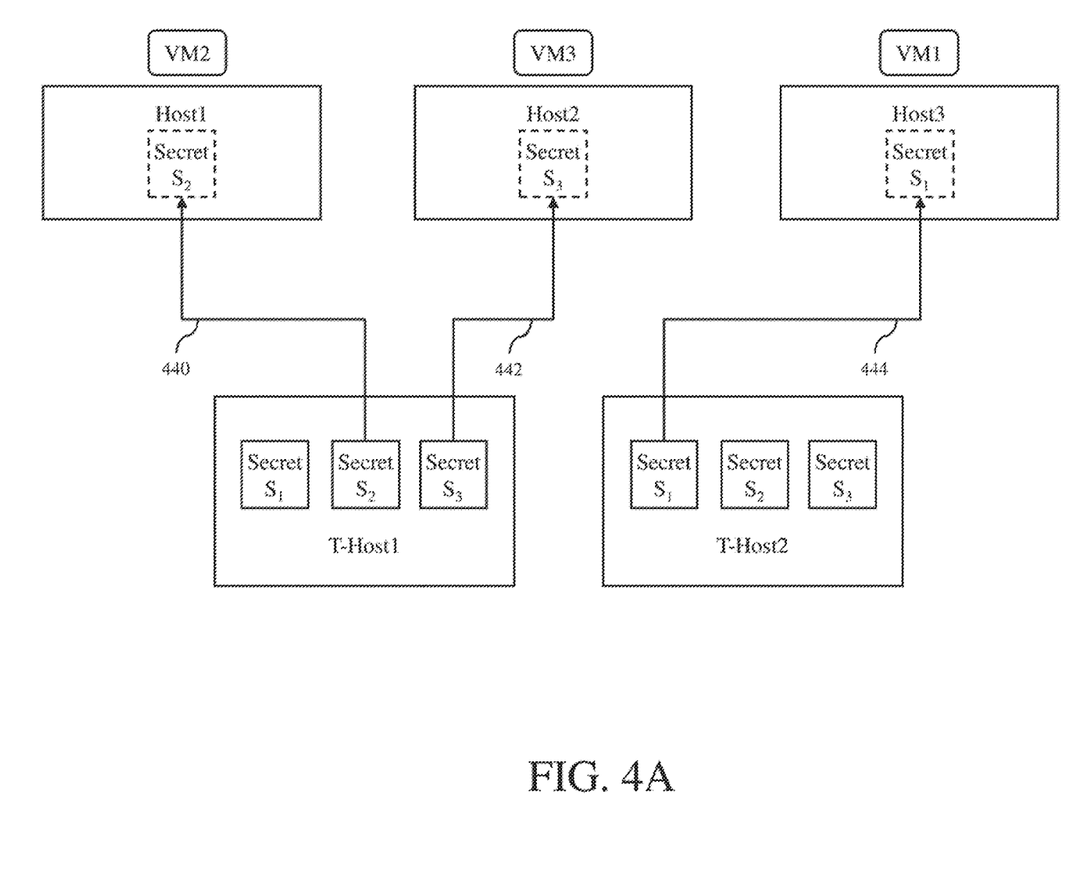
FIGS. 4A and 4B are block diagrams that illustrate the secret management process when a VM is migrated from one host computer to another host computer in accordance with the first embodiment of the invention.
Figure 4B:
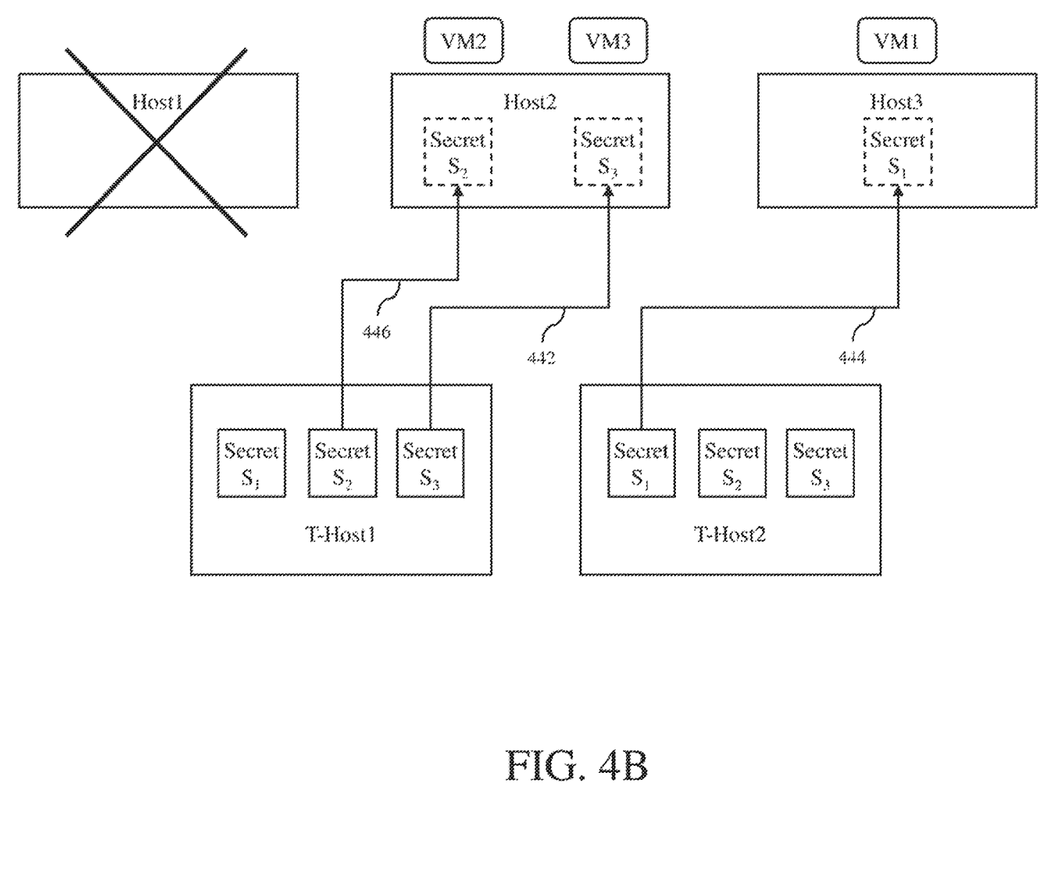

If the VM needs to be migrated to another host computer in the distributed computer system 100, blocks 312-322 are performed again so that the secret information can be used by the VM at the new host computer. This process is illustrated in FIGS. 4A and 4B using an example of three VMs (VM1, VM2 and VM3) each running on one of three host computers (Host1, Host2 and Host3). Specifically, VM2 is running on Host1, VM3 is running on Host2 and VM2 is running on Host3. In this example, there are two secret storage service entities in the form of two trusted host computers (T-Host1 and T-Host2), each of which is storing secrets $S_1$, $S_2$ and $S_3$ for VM1, VM2 and VM3, respectively. As illustrated in FIG. 4A, T-Host1 has been used to store and retrieve the secret $S_2$ for VM2 on Host1, as indicated by line 440, and the secret $S_3$ for VM3 on Host2, as indicated by line 442, while T-Host2 has been used to store and retrieve the secret $S_1$ for VM1 Host3, as indicated by line 444.

As illustrated in FIG. 4B, at some future time, Host1 is down for some reason, e.g., Host1 crashes due to hardware failure. Thus, VM2 has been moved from Host1 to Host2. In this scenario, Host2 retrieves the secret $S_2$ for VM2 from T-Host1 and provides the secret $S_2$ to which is now running on Host 1, as indicated by line 446, it is noted here that Host2 could have retrieved the secret $S_2$ for VM2 from T-Host2 instead since T-Host2 also has the secret $S_2$.

The above-described approach provides defense-in-depth because this approach, separates the storage of the secret information, which is used to protect data, from the location where the data is stored. In addition, since this approach involves storing secrets at secure secret storage service entities, such as security-strengthened trusted host computers, instead of regular host computers, and erasing secret information after usage, another layer of defense-in-depth is provided by the approach.

In a second embodiment of invention, the secret information for a VM is split into n secret pieces using any secret sharing scheme, such as Shamir's (k,n) threshold-based secret sharing scheme, where n is the number of pieces into, which a secret is divided, and k is the number of secret pieces that are needed to reconstruct the secret. In a particular implementation, a (2, n)-threshold secret sharing scheme is used so that two (2) secret pieces are needed to derive the original secret information. In this embodiment, one of the pieces of the secret information is held by the VM that has been assigned to the secret information. The other pieces of secret information are held by a group of host computers in the distributed computer system so that each host computer has one piece of the secret information. These host computers may be trusted host computers, i.e., security strengthened host computers. Thus, in this embodiment, all the host computers in the distributed host computers may be secret storage service entities.

When a VM is deployed on a designated host computer in the distributed computer system 100, the VM submits the piece of the secret information it holds to the host computer. The host computer then derives the secret information using the piece of the secret information it holds with the piece of the secret information from the VM. The host computer then provides the secret information to the VM for consumption. The secret information may be used by one or more application running on the VM or the VM itself.

When the VM is migrated to another host computer in the distributed computer system 100 for any reason, such as for high availability or for load balancing, the new host computer can similarly retrieve the same secret information using the piece of the secret information the new host computer holds with the piece of the secret information from the VM. Thus, the VM can be migrated to any host computer in the distributed computer system as long as that host computer holds one piece of the secret information for that VM.

When a new host computer is added to or deleted from the cluster, all the host computers in the cluster may execute an operation to re-split the secret information for all the VMs running in the cluster in accordance with the (2, n)-threshold secret sharing scheme, where n is increased by one for host addition or decreased by one for host deletion. This operation may involve a coordinated operation by the host computers to re-split the pieces of the secret information held by the host computers, and then distribute the new secret pieces to all the host computers, taking into account the newly added host computer or the recently deleted host computer. In an implementation, the secret pieces held by the VMs are not changed. Only the secret pieces held by the host computers are repartitioned to accommodate am addition of a new host computer or a deletion of an existing host computer. This process of repartitioning secret pieces in accordance with a (2, n)-threshold secret sharing scheme is well known, and thus, is not described herein. In an embodiment, the (2, n)-threshold secret sharing scheme is configured so that the piece of the secret information held by a VM must be used with another piece of that secret information to derive the secret information. Thus, in this embodiment, pieces of the secret information from two compromised host computers cannot be used to derive the secret information, unless the VM is deployed on one of the host computers after that host computer has been compromised.

Figure 5:
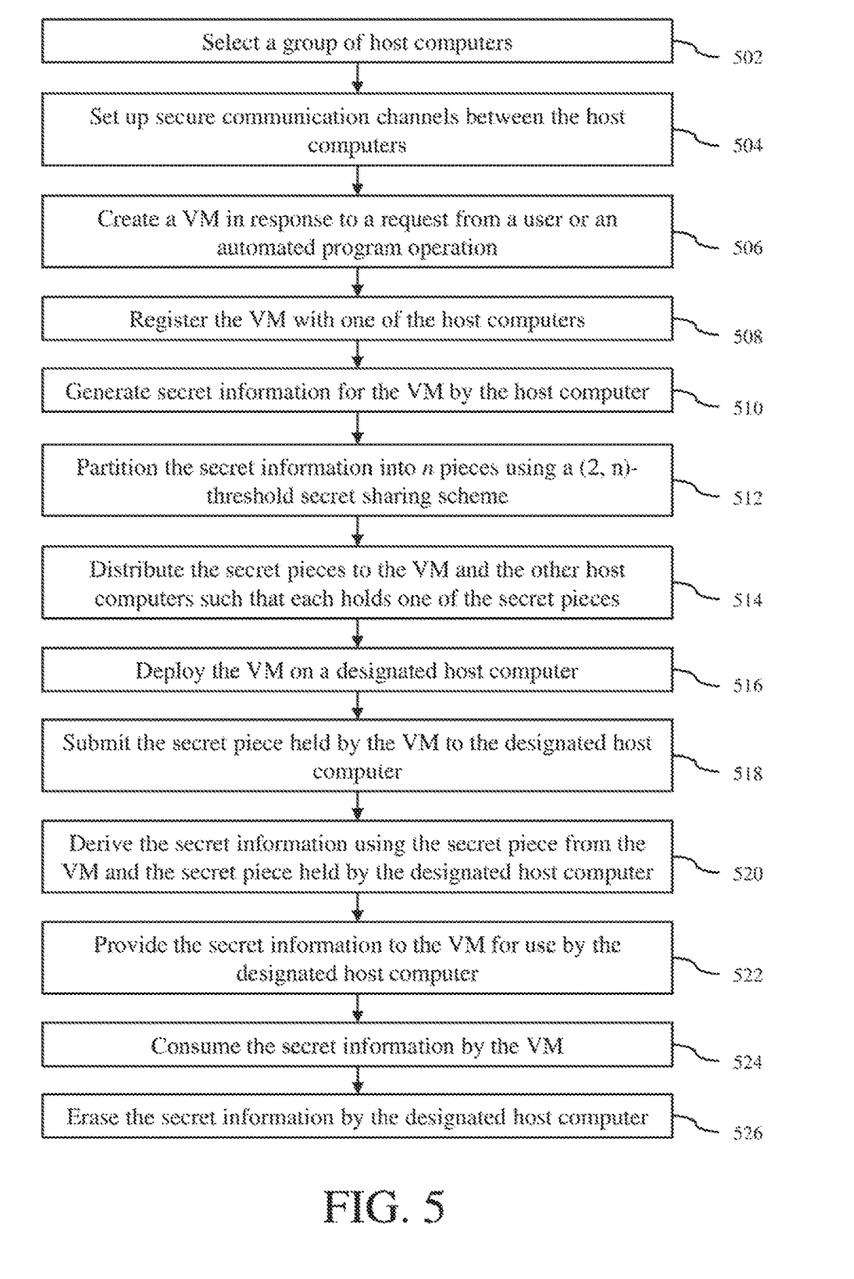
FIG. 5 is a process flow diagram of the secret management operation of the distributed computer system in accordance with a second embodiment of the invention.

This split-share secret management operation of the distributed computer system in, accordance with the second embodiment of the invention is described with reference to a process flow diagram of FIG. 5. At block 502, a group of host computers in the distributed computer system 100 is selected by a user, such as an administrator of the distributed computer system, to be secret storage service entities. In some implementations, all the host computers in the distributed computer system may be selected or defined as secret storage service entities. Next, at block 504, secure communication channels are set up between the host computers.

Next, at block 506, a VM is created by the cluster management server in response to user request or an automated program operation, such as an auto-scaling operation for a large-scale application running on multiple VMs. At block 508, the VM is registered with one of the host computers by the cluster management server 106 using an identification of the VM. At block 510, in response to the registration, secret information for the VM is generated by the trusted host computer. At block 512, the secret information is partitioned into n pieces using a (2, n)-threshold secret sharing scheme, where n is equal to the number of parties that will be holding the secret pieces, which is the total nullifier of host computers in the cluster plus one (1) for the VM that is assigned the secret information. At block 514, the secret pieces are distributed to the VM and the other host computers such that each holds one of the secret pieces. In addition to the secret pieces, the registration information for the VM, including the VM ID, may be shared with the other host computers.

Next, at block 516, the VM is deployed on a designated host computer among the group of host computers, which is controlled by the cluster management server 106. As part of the deployment, the ID of the VM is verified by the designated host computer to ensure that the right VM is being deployed at the designated host computer. At block 518, the secret piece held by the VM is submitted to the designated host computer. Next 520 the secret information is derived by the designated host computer using the secret piece from the VM and the secret piece held by the designated host computer.

Next, at block 522, the designated host computer provides the derived secret information to the VM for use. At block 524, the secret information is consumed by the VM, e.g., to obtain a session key, or by one or more applications running on the VM. As part of this consumption, the secret information is not stored by the VM, and thus, the secret information is not maintained by the VM. At block 526, after the VM has consumed the secret information, the designated host computer erases the secret information so that the host computer no longer has the secret information, i.e., the secret information is no longer stored on the host computer.

Figure 6A:
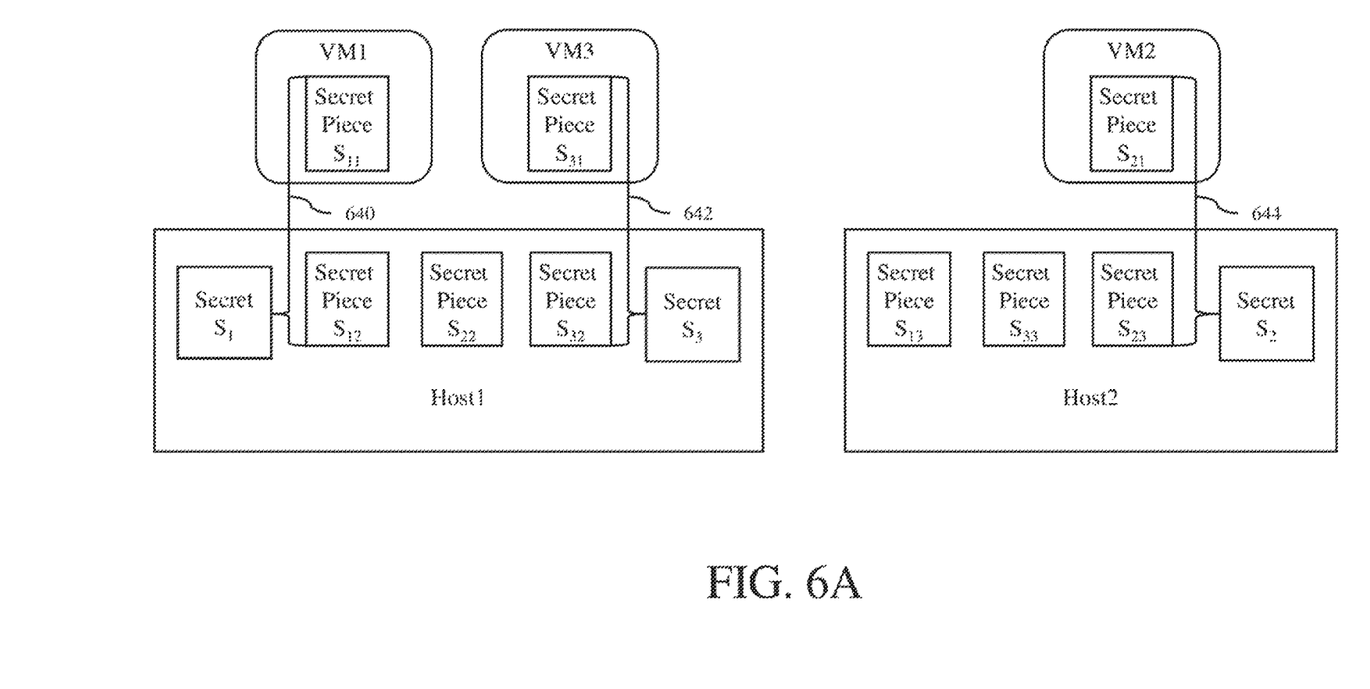
FIGS. 6A and 6B are block diagrams that illustrate the secret management process when a VM is migrated from one host computer to another host computer in accordance with the second embodiment of the invention.
Figure 6B:
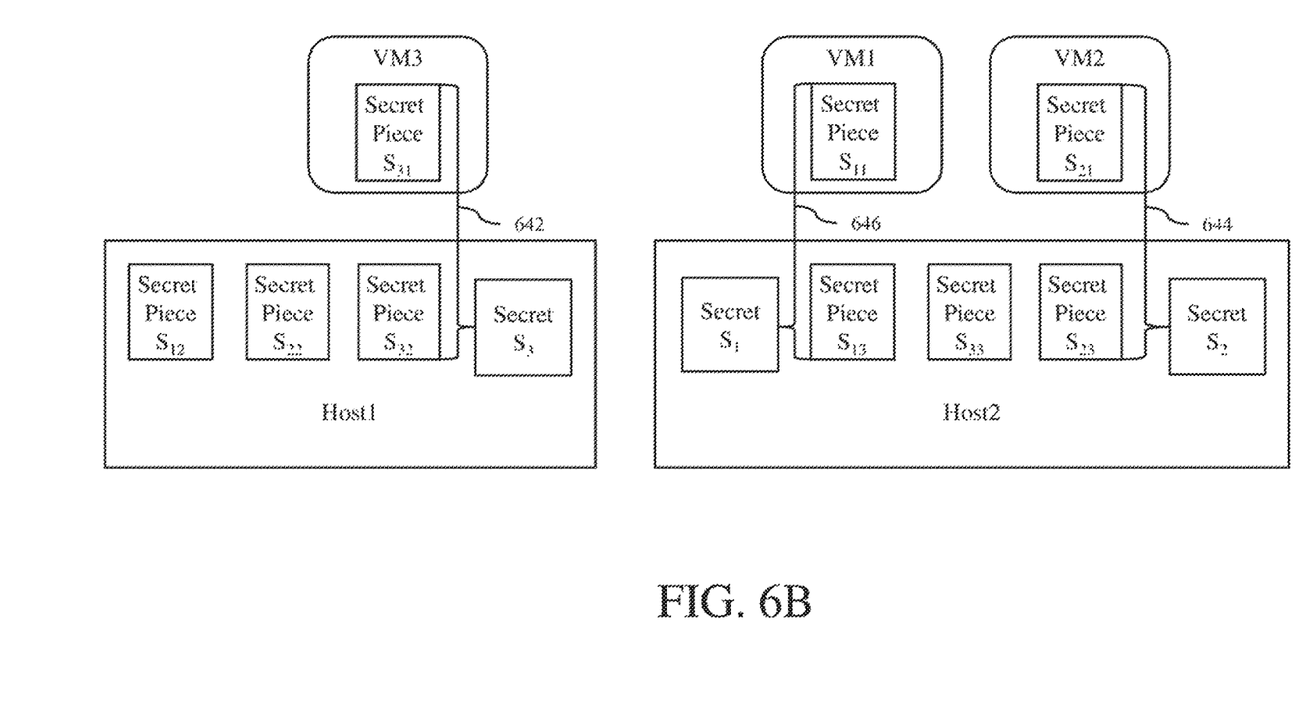

If the VM needs to be migrated to another host computer in the distributed computer system, blocks 518-526 are performed so that the secret information can be derived and used by the VM at the new host computer. This process is illustrated in FIGS. 6A and 6B using an example of three VMs (VM1, VM2 and VM3) that are running on two host computers (Host1 and Host2). Specifically, VM1 and VM3 are running on Host1, and VM2 is running on Host2. In this example, the secret for each of VM1, VM2 and VM3 have been split into three pieces. Specifically, the secret $S_1$ for VM1 has been split into secret pieces $S_{11}$, $S_{12}$ and $S_{13}$, the secret $S_2$ for VM2 has been split into secret pieces $S_{21}$, $S_{22}$ and $S_{23}$, and the secret $S_3$ for VM3 has been split into secret pieces $S_{31}$, $S_{32}$ and $S_{33}$. Each VM holds one of the secret pieces for the secret assigned to it. In this example, VM1, VM2 and VM2 hold the secret pieces $S_{11}$, $S_{21}$ and $S_{31}$, respectively. In addition, Host1 holds the secret pieces $S_{12}$, $S_{22}$ and $S_{32}$, while Host2 holds the secret pieces $S_{13}$, $S_{23}$ and $S_{33}$.

As illustrated in FIG. 6A, Host1 has provided the secret $S_1$ to VM1 using the secret piece $S_{11}$ from VM1 and the secret piece $S_{12}$ held by Host1, as indicated by bracket 640. Host1 has also provided the secret $S_3$ to VM3 using the secret piece $S_{31}$ from VM3 and the secret piece $S_{32}$ held by Host1, as indicated by bracket 642. Similarly, Host2 has provided the secret $S_2$ to VM2 using the secret piece $S_{21}$ from VM2 and the secret piece $S_{23}$ held by Host2, as indicated by bracket 644.

As illustrated in FIG. 6B, at some future time, VM1 has been moved from Host1 to Host2. In this scenario, Host2 retrieves the secret $S_1$ for VM1 using the secret piece $S_{11}$ from VM1 and the secret piece $S_{13}$ held by Host2, as indicated by bracket 646.

In this second approach, protection of the secret information is improved by splitting the secret information and distributing the secret pieces among all involving entities, i.e., all the host computers and the VM that is assigned to the secret information. If the VM is compromised, the adversary can only get a piece of the secret information and cannot derive the entire secret information. Similarly, if only one trusted host computer is compromised, the adversary cannot obtain the entire secret information from the secret piece held by that trusted host computer, unless a VM that has just been deployed on that compromised host computer at d the later can derive the secret after obtaining the secret piece held by the VM.

Figure 7:
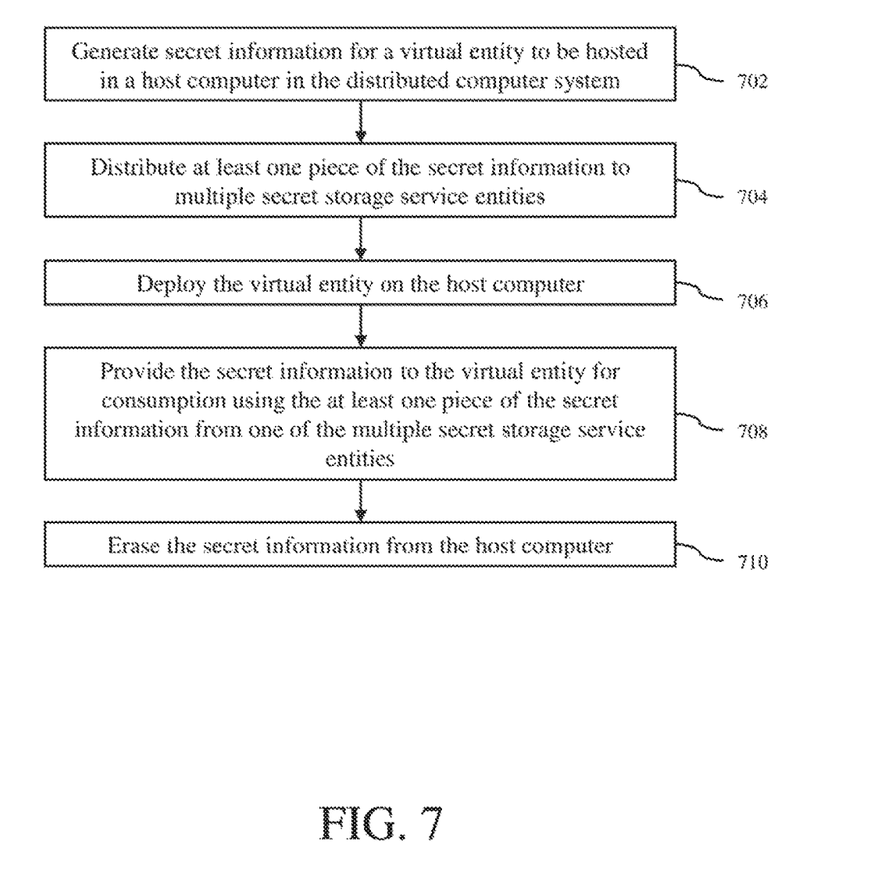
FIG. 7 is a flow diagram of a method for managing secret information for virtual entities in a distributed computer system in accordance with an embodiment of the invention.

A method for managing secret information for virtual entities, e.g., virtual machines, in a distributed computer system in accordance with an embodiment of the invention is described with reference to a flow diagram of FIG. 7. At block 702, secret information for a virtual entity to be hosted in a host computer in the distributed computer system is generated. At block 704, at least one piece of the secret information is distributed to multiple secret storage service entities. At block 706, the virtual entity is deployed on the host computer. At block 708, the secret information is provided to the virtual entity, by the host computer, for consumption using the at least one piece of the secret information from one of the multiple secret storage service entities, wherein the secret information is stored on the host computer. At block 710, the secret information is erased from the host computer.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described m connection with an embodiment is included in least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing secret information for virtual entities in a distributed computer system, the method comprising:
    generating secret information for a virtual entity, wherein the virtual entity is to be hosted in a host computer in the distributed computer system;
    partitioning the secret information into a plurality of secret pieces using a secret sharing scheme, wherein the secret sharing scheme includes a (k, n)-threshold secret sharing scheme, where n is equal to the number of parties that will be holding the secret pieces and k is the number of secret pieces that are needed to derive the secret information;
    distributing at least one piece of the secret information to multiple secret storage service entities, including distributing at least one of the secret pieces to each host computer in a group of host computers in the distributed computer system and to the virtual entity;
    deploying the virtual entity on the host computer;
    providing the secret information to the virtual entity, by the host computer, for consumption by the virtual entity using the at least one piece of the secret information from one of the multiple secret storage service entities, wherein the secret information is stored on the host computer; and
    erasing the secret information from the host computer on which the virtual entity is deployed.

2. The method of claim 1, wherein distributing at least one piece of the secret information to multiple secret storage service entities includes distributing the entire secret information to the multiple secret storage service entities.

3. The method of claim 1, wherein providing the secret information to the virtual entity for consumption includes requesting the secret information from one of the multiple secret storage service entities by the host computer, and transmitting the secret information from that secret storage service entity to the host computer in response to the request.

4. The method of claim 1, further comprising:
    migrating the virtual entity from the host computer to another host computer in the distributed computer system; and
    providing the secret information to the virtual entity on the another host computer using the at least one piece of the secret information from one of the multiple secret storage service entities.

5. The method of claim 1, wherein the (k, n)-threshold secret sharing scheme is a (2, n)-threshold secret sharing scheme so that at least two of the secret pieces are needed to derive the secret information.

6. The method of claim 1, wherein providing the secret information to the virtual entity for consumption includes deriving the secret information using the secret piece from the virtual entity and the secret piece from the host computer.

7. The method of claim 1, further comprising:
    migrating the virtual entity from the host computer to another host computer in the distributed computer system;
    deriving the secret information using the secret piece from the virtual entity and the secret piece from the another host computer; and
    providing the secret information to the virtual entity on the another host computer.

8. A non-transitory computer-readable storage medium containing program instructions for managing secret information for virtual entities in a distributed computer system, wherein execution of the program instructions by one or more processors of a computer system causes the one or more processors to perform steps comprising:
    generating secret information for a virtual entity to be hosted in a host computer in the distributed computer system;
    partitioning the secret information into a plurality of secret pieces using a secret sharing scheme, wherein the secret sharing scheme includes a (k, n)-threshold secret sharing scheme, where n is equal to the number of parties that will be holding the secret pieces and k is the number of secret pieces that are needed to derive the secret information;
    distributing at least one piece of the secret information to multiple secret storage service entities, including distributing at least one of the secret pieces to each host computer in a group of host computers in the distributed computer system and to the virtual entity;
    deploying the virtual entity on the host computer;
    providing the secret information to the virtual entity, by the host computer, for consumption using the at least one piece of the secret information from one of the multiple secret storage service entities, wherein the secret information is stored on the host computer; and
    erasing the secret information from the host computer on which the virtual entity is deployed.

9. The computer-readable storage medium of claim 8, wherein distributing at least one piece of the secret information to multiple secret storage service entities includes distributing the entire secret information to the multiple secret storage service entities.

10. The computer-readable storage medium of claim 8, wherein providing the secret information to the virtual entity for consumption includes requesting the secret information from one of the multiple secret storage service entities by the host computer, and transmitting the secret information from that secret storage service entity to the host computer in response to the request.

11. The computer-readable storage medium of claim 8, wherein the steps further comprise:
    migrating the virtual entity from the host computer to another host computer in the distributed computer system; and
    providing the secret information to the virtual entity on the another host computer using the at least one piece of the secret information from one of the multiple secret storage service entities.

12. The computer-readable storage medium of claim 8, wherein the (k, n)-threshold secret sharing scheme is a (2, n)-threshold secret sharing scheme so that at least two of the secret pieces are needed to derive the secret information.

13. The computer-readable storage medium of claim 8, wherein providing the secret information to the virtual entity for consumption includes deriving the secret information using the secret piece from the virtual entity and the secret piece from the host computer.

14. The computer-readable storage medium of claim 8, wherein the steps further comprise:
   migrating the virtual entity from the host computer to another host computer in the distributed computer system;
   deriving the secret information using the secret piece from the virtual entity and the secret piece from the another host computer; and
   providing the secret information to the virtual entity on the another host computer.

15. A distributed computer system comprising:
   a plurality of host computers with memories and processors; and
   a plurality of virtual entities hosted on at least some of the host computers, each of the virtual entities being assigned secret information;
   wherein at least one of the host computers is configured to partition the secret information for each of the virtual entities into a plurality of secret pieces using a secret sharing scheme, wherein the secret sharing scheme includes a (k, n)-threshold secret sharing scheme, where n is equal to the number of parties that will be holding the secret pieces and k is the number of secret pieces that are needed to derive the secret information, and wherein at least one of the secret pieces of each secret information is distributed to each of the host computers and to the virtual entity to which that secret information is assigned, and
   wherein at least one of the host computers is configured to provide the secret information of the particular virtual entity deployed on that host computer using the at least one piece of the secret information assigned to the particular virtual entity from one of the host computers that are storing the at least one piece of the secret information for each of the virtual entities, and to erase the secret information from that host computer on which the particular virtual entity is deployed.

16. The distributed computer system of claim 15, wherein the host computers that are storing the at least one piece of the secret information for each of the virtual entities are host computers that are storing the entire secret information for each of the virtual entities.

17. The distributed computer system of claim 15, wherein at least one of the host computers is configured to provide the secret information of the particular virtual entity when the particular virtual entity is migrated to a new host computer using the at least one piece of the secret information assigned to the particular virtual entity from one of the host computers that are storing the at least one piece of the secret information for each of the virtual entities.

18. The distributed computer system of claim 15, wherein the host computer on which the particular virtual entity is deployed is configured to derive the secret information assigned to the particular virtual entity using the secret piece from the virtual entity and the secret piece from the host computer.

19. The distributed computer system of claim 15, wherein at least one of the host computers is configured to provide the secret information of the particular virtual entity when the particular virtual entity is migrated to a new host computer using the secret piece of the secret information assigned to the particular virtual entity held by the particular virtual entity and the secret piece of the secret information assigned to the particular virtual entity held by the new host computer.

* * * * *